US006790026B2

(12) United States Patent
Vandangeot et al.

(10) Patent No.: US 6,790,026 B2
(45) Date of Patent: Sep. 14, 2004

(54) SYSTEM FOR CO-MOLDING A THERMOPLASTIC MATERIAL WITH A THERMOPLASTIC SANDWICH MATERIAL AND ARTICLE PRODUCED THEREBY

(75) Inventors: Francis Vandangeot, Chateaubriant (FR); Emmanuel Boivin, Vernon (FR); Loic Durual, Domarin (FR)

(73) Assignee: Patent Holding Company, Fraser, MI (US)

( * ) Notice: Subject to any disclaimer, the term of this patent is extended or adjusted under 35 U.S.C. 154(b) by 47 days.

(21) Appl. No.: 10/187,814

(22) Filed: Jul. 2, 2002

(65) Prior Publication Data

US 2002/0167113 A1 Nov. 14, 2002

Related U.S. Application Data

(62) Division of application No. 09/525,346, filed on Mar. 15, 2000, now Pat. No. 6,682,675.

(51) Int. Cl.[7] .......................... B29C 43/40; B29C 70/46
(52) U.S. Cl. ................... 425/510; 425/112; 425/126.1; 425/128; 425/290; 425/398; 425/521
(58) Field of Search .............................. 425/112, 126.1, 425/128, 290, 398, 510, 517, 521

(56) References Cited

U.S. PATENT DOCUMENTS 3,007,377 A * 11/1961 Muller ........................ 493/154

(List continued on next page.)

FOREIGN PATENT DOCUMENTS

DE         1299 853         7/1969

(List continued on next page.)

OTHER PUBLICATIONS

U. Breuer, et al., Deep Drawing of Fabric–Reinforced Thermoplastics: Wrinkle Formation and Their Reduction, Polymer Composites, Aug. 1996, vol. 17, No. 4, pp. 643–647.

*Primary Examiner*—Robert B. Davis
(74) *Attorney, Agent, or Firm*—Brooks Kushman P.C.

(57) ABSTRACT

A method and system for co-molding a thermoplastic material with a thermoplastic sandwich material to form a thermoplastic sandwich article having a thermoplastic inner portion are provided. In one embodiment, the thermoplastic material may be a composite material and the article is a deep-drawn article. In this embodiment, the method and system include a female die having an article-defining cavity defined by inner surfaces of the female die and an outer male die for forcing an inner portion of a blank of thermoplastic sandwich material having a cellular core and a predetermined amount of thermoplastic composite material placed on the blank into the female die along a substantially vertical axis and against the inner surfaces of the female die to obtain deep-drawn sandwich material. In a second embodiment in which the article formed is not deep-drawn, the outer male die is not required. A crushing device is provided for crushing a peripheral edge portion of the deep-drawn sandwich material formed completely about the thermoplastic composite material. An inner male die forces the thermoplastic composite material and the deep-drawn sandwich material within the peripheral edge portion together at a temperature and pressure sufficient to fuse the materials together to form a thermoplastic composite inner portion of the deep-drawn sandwich material. In the first embodiment, a clamping mechanism clamps a plurality of spaced outer portions of the blank immediately adjacent the female die to guide the plurality of spaced outer portions of the blank to travel into the article-defining cavity at an acute angle with respect to the vertical axis during forcing of the inner portions of the blank into the female die so that thickness of side walls of the deep-drawn sandwich material is substantially the same as thickness of the blank of thermoplastic sandwich material and so that the deep-drawn sandwich material does not significantly stretch or tear as the inner portions of the blank are forced into the female die. In the second embodiment, the clamping mechanism is also not needed.

15 Claims, 3 Drawing Sheets

U.S. PATENT DOCUMENTS

| | | | |
|---|---|---|---|
| 3,709,968 A | | 1/1973 | Houghton |
| 4,224,275 A | | 9/1980 | Sauer |
| 4,228,121 A | * | 10/1980 | Meadors ..................... 425/398 |
| 4,315,050 A | | 2/1982 | Rourke |
| 4,702,688 A | | 10/1987 | Schenk |
| 4,917,747 A | | 4/1990 | Chin et al. |
| 5,199,595 A | | 4/1993 | Muggli et al. |
| 5,217,563 A | | 6/1993 | Niebling et al. |
| 5,431,871 A | * | 7/1995 | Tanaka et al. ........... 425/126.1 |
| 5,876,654 A | | 3/1999 | Blonigen et al. |
| 5,908,524 A | * | 6/1999 | Masui et al. ................. 156/212 |
| RE36,457 E | | 12/1999 | Ellison et al. |
| 6,328,549 B1 | * | 12/2001 | Valyi et al. ................... 425/112 |
| 6,616,586 B2 | * | 9/2003 | Dai ............................ 425/398 |
| 2002/0185779 A1 | * | 12/2002 | Renault et al. .............. 264/259 |

FOREIGN PATENT DOCUMENTS

| | | | | |
|---|---|---|---|---|
| DE | 2636463 A1 | | 2/1978 | |
| DE | 4442014 A1 | * | 6/1995 | ........... B29C/67/20 |
| DE | 197 41 917 A1 | | 9/1999 | |
| EP | 0 649 736 A1 | | 4/1995 | |
| EP | 0 855 309 A1 | | 7/1998 | |
| EP | 894611 A1 | | 2/1999 | |
| EP | 0 903 216 A2 | | 3/1999 | |
| EP | 903216 A2 | | 3/1999 | |
| EP | 1097794 A1 | * | 5/2001 | ........... B29C/51/26 |
| FR | 2 751 914 A1 | | 2/1998 | |
| FR | 2 763 881 A1 | | 12/1998 | |
| JP | 06344431 A | * | 12/1994 | ........... B29C/51/08 |
| JP | 08-112856 | | 5/1996 | |
| WO | WO 98/04398 A1 | | 2/1998 | |

* cited by examiner

SYSTEM FOR CO-MOLDING A THERMOPLASTIC MATERIAL WITH A THERMOPLASTIC SANDWICH MATERIAL AND ARTICLE PRODUCED THEREBY

CROSS-REFERENCE TO RELATED APPLICATION

This application is division of U.S. patent application Ser. No. 09/525,346, filed Mar. 15, 2000, now issued as U.S. Pat. No. 6,682,675.

TECHNICAL FIELD

This invention relates to methods and systems for co-molding thermoplastic materials such as thermoplastic composite materials with thermoplastic sandwich materials and articles produced thereby.

BACKGROUND ART

Manufacturing Thermoplastic Sandwich Materials (i.e. TSM)

European patent EP 0 649 736 B1 explains the principle of molding substantially flat parts out of thermoplastic sandwich material (TSM). The part is made in a single stage by pressing in a cold mold, at a pressure in the range of 10 bars to 30 bars, a stack consisting of at least a first top skin layer of stampable reinforced thermoplastics material, a cellular or honeycomb core of thermoplastics material and a second bottom skin layer of stampable reinforced thermoplastics material. The axes of the cells of the cellular core are generally oriented perpendicular to the skin layers. The skin layers and core are previously heated outside the mold to a softening temperature.

As described in French patent application 97 06666, it is possible to make a fixation or fixing with a hole by piercing the thermoplastic sandwich material in the mold with a sharp tool.

As described in French Patent No. 2 751 914, it is possible to reinforce the radial resistance of a fixation in such a TSM part by completely crushing the central honeycomb.

European patent application EP 0 903 216 A2 discloses over-molding a steel insert with claws that are anchored in the thermoplastic sandwich material to distribute the load on the insert.

Drawbacks Of The Steel Insert With Claws

The results are very good for shear resistance of the fixation or insert if the skins use woven fibers, but the results are poor if the skins use non-woven fibers;

It is necessary to invest in an additional tool to stamp the steel insert;

It is necessary to treat the steel insert to avoid corrosion; and

The part is not tight anymore because of the through hole and because of the claws that create holes in the skins.

In the case of fixations or inserts that do not include through holes, it is possible to add such inserts in secondary operations:

Vibration welding, heat welding, and ultrasonic welding can be used to weld inserts made of the same thermoplastic as the skins;

Clips can be used in a shape made in the sandwich part;

Semi-structural gluing with low mechanical resistance if the surface is not prepared for good bonding;

Structural adhesion to assemble the sandwich part with another part; in that case, an outer surface of the sandwich part as well as the other part surface must be treated with an adhesion promoter to improve the gluing between the two parts; and Mechanical fastening with inserts such as rivets.

These operations represent an additional cost due to additional workforce and machines.

Also, the recyclability of the part is not as good if other materials such as inserts are used.

In conclusion and before the present invention, there was no solution to integrate a TSM part with another part directly during the molding process and without drilling a hole as a preliminary step, if high loads are to be applied to the resulting part.

Solutions Developed For Sandwich Panels Used In Aeronautics, Trains, and Other Industries The Hexcel Company has developed a variety of ways to mechanically fasten fixings to their composite panels. However, each of the methods are time-consuming and costly.

Molding of a Thermoplastic Composite Material Such As GMT (Flowable PP-Glass Mat) Material and Thermoplastic Sandwich Material The technique of molding GMT (Glass Mat Thermoplastics) materials uses a thermoplastic (polypropylene is preferred) and glass mats just as sandwich materials but the molding process of GMT is at a relatively high pressure (i.e. pressures of 100–200 bars ($10^7$N–2× $10^7$N)) whereas thermoplastic sandwich materials uses a pressure 10 to 20 times lower (i.e. 10 to 20 bars ($10^6$N–2× $10^6$N)).

The GMT process is a flow pressure process wherein the GMT material flows under pressure in a mold and allows the production of parts as thin as 2 mm and with the possible integration of the following features:

Ribs can be molded to improve stiffness; and

Inserts can be over-molded.

The technique of molding thermoplastic sandwich material can be used to mold with a low pressure of 10 to 20 bars semi-structural or structural parts, possibly with a 3D deep-draw, while maintaining a constant thickness as described in the above-noted copending U.S. application. If the constant thickness is maintained, the stiffness/weight ratio of the material is very high as compared to GMT.

DISCLOSURE OF INVENTION

An object of the present invention is to provide a method and system for co-molding a thermoplastic material with a thermoplastic sandwich material and article produced thereby wherein the thermoplastic material portion of the article allows the article to be easily attached to another article such as a car body.

Another object of the present invention is to provide a method and system for co-molding a thermoplastic material with a thermoplastic sandwich material and article produced thereby wherein the thermoplastic sandwich material is integrated or fused with the thermoplastic material during the molding process so that the article can withstand high loads.

Yet another object of the present invention is to provide a method and system for co-molding a thermoplastic material with a thermoplastic sandwich material and article produced thereby wherein the article takes full advantage of the properties of the two materials.

In carrying out the above objects and other objects of the present invention, a method for co-molding a thermoplastic material with a thermoplastic sandwich material to form a thermoplastic sandwich article having a thermoplastic inner portion is provided. The method includes positioning a blank of thermoplastic sandwich material having a cellular core over a female die having an article-defining cavity defined by inner surfaces of the female die. The method also includes placing a predetermined amount of thermoplastic material on the blank of thermoplastic sandwich material. An inner portion of the blank is forced into the female die along a substantially vertical axis and against the inner surfaces of the female die. A peripheral edge portion of the sandwich material is crushed about the thermoplastic material. The thermoplastic material and the sandwich material are forced within the peripheral edge portion together at a temperature and pressure sufficient to fuse the materials together to form a thermoplastic inner portion of the sandwich material. The method further includes removing the sandwich material with the thermoplastic inner portion from the female die, and removing any excess material from the periphery of the sandwich material to form the article.

In one embodiment, the step of forcing obtains a deep-drawn sandwich material. In this embodiment, at least one outer portion of the blank is clamped immediately adjacent the female die to guide the at least one outer portion of the blank to travel into the article-defining cavity at an acute angle with respect to the vertical axis during the step of forcing so that thickness of at least one side wall of the deep-drawn sandwich material is substantially the same as thickness of the blank of thermoplastic sandwich material and so that the deep-drawn sandwich material does not significantly stretch or tear during the step of forcing. The resulting article is a deep-drawn article.

The predetermined amount of thermoplastic material may be a blank of the thermoplastic material, an extrusion of the thermoplastic material, or an injection of the thermoplastic material.

The step of forcing the inner portion may include the step of stamping.

The step of clamping may be performed with a clamping force which increases during the step of forcing the inner portion.

The step of clamping may be performed at a plurality of spaced outer portions of the blank immediately adjacent the female die.

The step of forcing the inner portion preferably is performed in a single stamping stage.

The method further comprises the step of placing a nut or stud within the article-defining cavity so that the thermoplastic material over-molds the nut or stud.

Further in carrying out the above objects and other objects of the present invention, a system for co-molding a thermoplastic material with a thermoplastic sandwich material to form a thermoplastic sandwich article having a thermoplastic inner portion is provided. The system includes a female die having an article-defining cavity defined by inner surfaces of the female die. A crushing device is provided for crushing a peripheral edge portion of a blank of sandwich material having a cellular core about a predetermined amount of thermoplastic material placed on the blank. A male die is provided for forcing the thermoplastic material and the sandwich material within the peripheral edge portion together at a temperature and pressure sufficient to fuse the materials together to form a thermoplastic inner portion of the sandwich material.

The system may further include an outer male die for forcing an inner portion of the blank of thermoplastic sandwich material and the predetermined amount of thermoplastic material placed on the blank into the female die along a substantially vertical axis and against the inner surfaces of the female die to obtain deep-drawn sandwich material.

The system may also further include a clamping mechanism for clamping at least one outer portion of the blank immediately adjacent the female die to guide the at least one outer portion of the blank to travel into the article-defining cavity at an acute angle with respect to the vertical axis during forcing of the inner portion of the blank into the female die so that thickness of at least one side wall of the deep-drawn sandwich material is substantially the same as thickness of the blank of thermoplastic sandwich material and so that the deep-drawn sandwich material does not significantly stretch or tear as the inner portion of the blank is forced into the female die.

A stamping press may be provided for forcing the outer male die into the female die.

A hydraulic jack may be provided for forcing the male die into the female die.

The thermoplastic material may be a thermoplastic composite material.

The predetermined amount of thermoplastic material may be a blank of thermoplastic composite material.

An extruder may be provided for extruding the predetermined amount of thermoplastic material.

An injector may be provided for injecting the predetermined amount of thermoplastic material.

The clamping mechanism may be spring-loaded so that the clamping mechanism exerts a clamping force at the at least one outer portion of the blank, the clamping force increasing as the inner portion of the blank is forced into the female die.

The clamping mechanism preferably includes a clamping assembly mounted to move with the male die and having at least one spring which compresses as the inner portion of the blank is forced into the female die.

The clamping mechanism preferably includes a clamping assembly and a counter clamping assembly for clamping a plurality of spaced outer portions of the blank immediately adjacent the female die so that a substantially constant distance is maintained between the clamping assembly and the counter clamping assembly as the inner portion of the blank is forced into the female die. Each of the assemblies typically includes a plurality of elongated clamping surfaces for clamping the plurality of spaced outer portions of the blank. Each elongated clamping surface is inclined at the acute angle with respect to the vertical axis.

The inner surfaces of the female die may define a plurality of corners which correspond to spaces between the plurality of spaced outer portions. The spaces are sized to permit thermoplastic sandwich material of the blank to move therein as the inner portion of the blank is forced into the female die.

Preferably, in both the method and system the peripheral edge portion of the sandwich material completely encloses the thermoplastic material.

Co-molding a thermoplastic composite material such as GMT and a thermoplastic sandwich material combines the advantages of the sandwich material (stiffness/weight ratio, low pressure process) and GMT (flow process to mold complex shapes such as ribs but also the possibility to mold a part without excess material where the edge of the part is molded by flow).

The above objects and other objects, features, and advantages of the present invention are readily apparent from the following detailed description of the best mode for carrying out the invention when taken in connection with the accompanying drawings.

BEST MODE FOR CARRYING OUT THE INVENTION

This application is related to U.S. patent application Ser. No. 09/525,785, filed Mar. 15, 2000, now issued as U.S. Pat. No. 6,682,676, and to U.S. patent application Ser. No. 10/187,826, filed Jul. 2, 2002.

Figure 1:
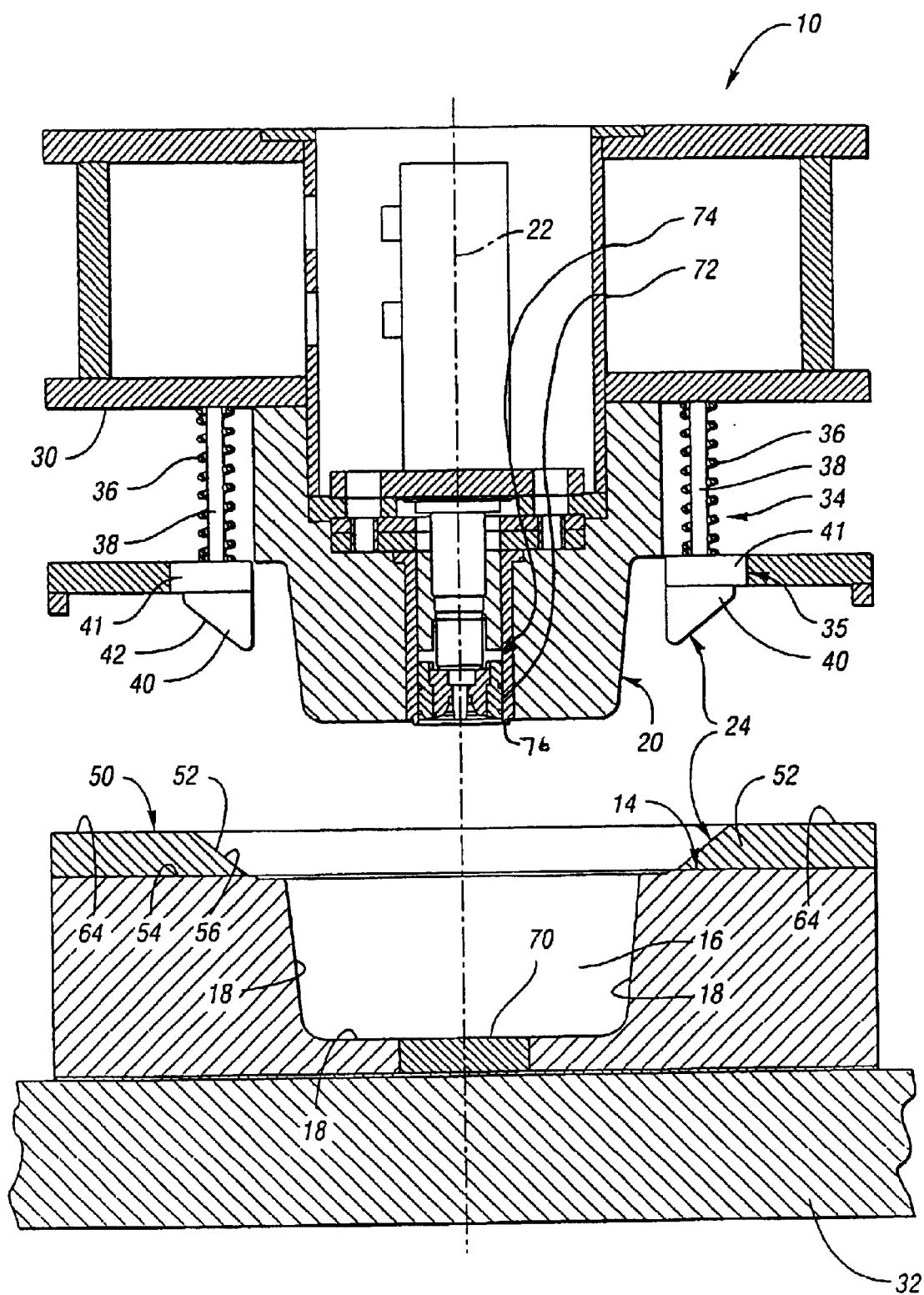
FIG. 1 is a schematic view of a thermoplastic sandwich material (TSM) outer mold in an open position with a glass mat thermoplastic (GMT) inner mold and illustrating a shear edge, a hydraulic dashpot or jack and a steel sleeve of the male die of the inner mold and a steel plate of the female die of the inner mold.
Figure 2:
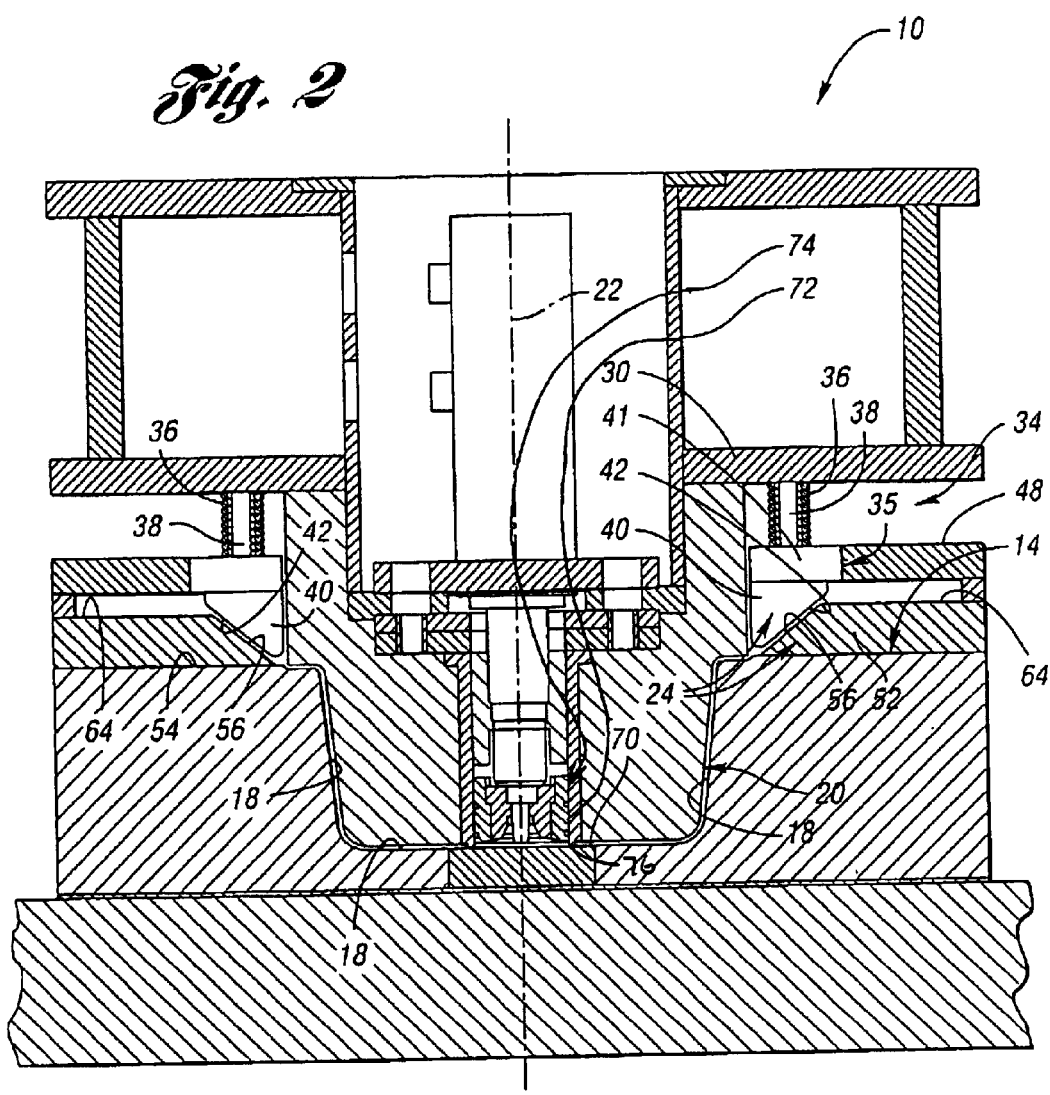
FIG. 2 is a schematic view of the inner and outer molds of FIG. 1 in the closed position of the outer mold, and further including a stop of the outer mold.
Figure 3:
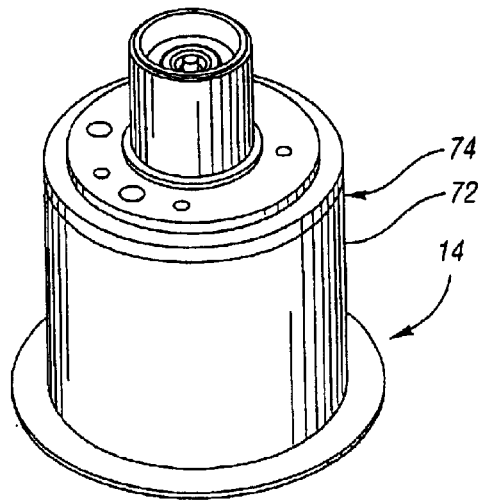
FIG. 3 is a top perspective view of the male die of the inner mold in contact with the female die of the inner mold and illustrating the steel sleeve and the hydraulic dashpot.
Figure 4:
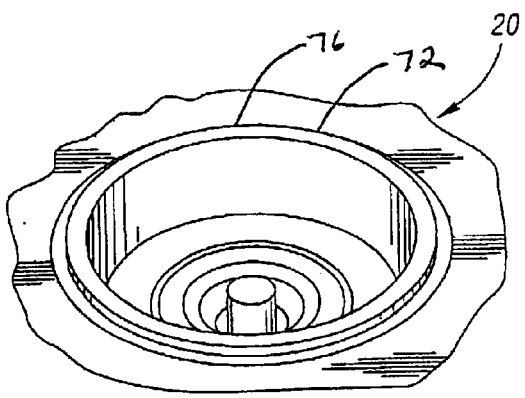
FIG. 4 is a bottom perspective view of the male die of the inner mold fully retracted within the male die of the outer mold and illustrating the shear edge of the steel sleeve used to crush the TSM and ensure the tightness of the inner mold.

Referring now to the drawing figures, there is illustrated in FIGS. 1 and 2 a system, generally indicated at 10, for co-molding a thermoplastic composite material (TCM) such as GMT with a thermoplastic sandwich material (TSM) to form or produce an article. However, it is to be understood that the thermoplastic material need not be a composite material.

The particular problem that was solved is exemplified by the problem of how to fix a GMT insert in a sandwich part (such as a spare wheel tub) that is required to resist a force of 3000 N in three directions so that a spare wheel can be attached onto the tub at the insert. Consequently, it is desirable to have a method and system of the present invention for co-molding a GMT insert with a sandwich tub so that a spare wheel can be fixed within the tub at the insert.

While the present invention is described with reference to the above-noted application, it is to be understood that the present invention can be practiced without using the apparatus of the above application which is used to deep-draw the plastic article, that is, the outer male die and the clamping mechanism.

The Mold

Male and female dies of the above-noted U.S. patent application may be modified with a steel inner mold including inner male and female parts added at their central portions to mold with high pressure a GMT over-molded part. The system of the above-noted application is described hereinbelow.

In general, the invention deals with the development of a new co-molding method and system to form thermoplastic sandwich parts or articles which have a thermoplastic composite inner portion made from a thermoplastic such as a glass mat thermoplastic (GMT) or an extruded or injected thermoplastic blank molding compound. The sandwich material is made of two outer reinforced thermoplastic skins with a cellular core at the center and is molded by a thermocompression process, as generally described in U.S. Pat. No. 5,683,782. The skins may be polypropylene with continuous glass mats or woven glass with polypropylene fibers. The method and system of the invention allows one to mold thermoplastic sandwich parts with or without a deep-draw and with a cost and a cycle time that can be used for automotive and other high volume applications.

Figure 7:
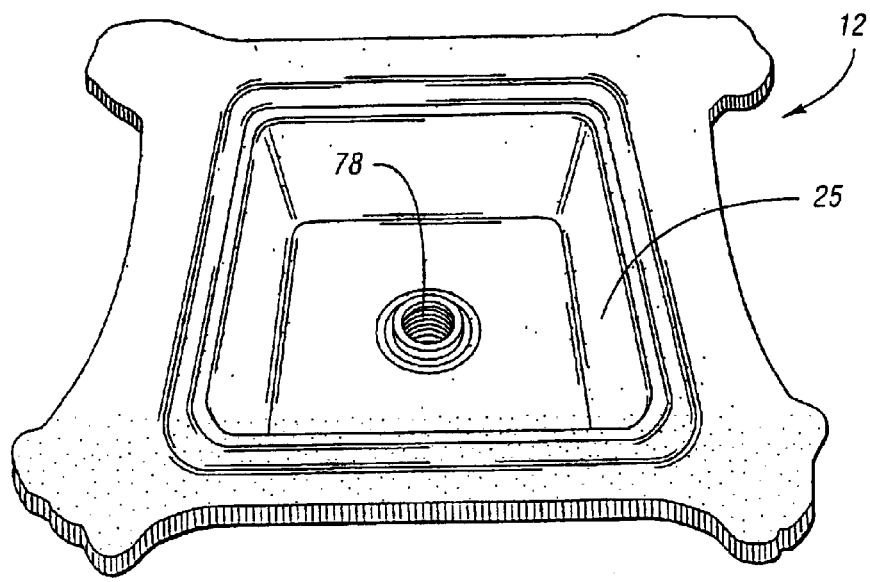
FIG. 7 is a top perspective view of a co-molded tub produced by the method and system of the present invention.

Referring now to FIG. 1, there is illustrated a system, generally indicated at 10, for making a deep-drawn thermoplastic sandwich article such as a tub, generally indicated at 12 in FIG. 7. The system includes a female die, generally indicated at 14, having an article-defining cavity 16 defined by inner surfaces 18 of the female die 14. The female die is positioned on a lower base member 32 of a press.

The system 10 also includes an outer male die, generally indicated at 20, mounted on a movable member 30 of the press for forcing an inner portion of a blank of thermoplastic sandwich material having a cellular core into the female die 14 along a substantially vertical axis 22 and against the inner surfaces 18 of the female die 14 to obtain deep-drawn material. The stamping press including the upper movable member 30 forces the male die 20 into the female die 14 which is supported on the lower base member 32 of the stamping press.

The system 10 also includes a clamping mechanism, generally indicated at 24, for clamping at least one outer portion of the blank immediately adjacent the female die 14 to guide the at least one outer portion of the blank to travel into the article-defining cavity 16 at an acute angle with respect to the vertical axis 22 during forcing of the inner portion of the blank into the female die 14 so that thickness of at least one side wall 25 of the deep-drawn material is substantially the same as thickness of the blank of thermoplastic sandwich material (as shown in FIG. 7) and so that the deep-drawn material does not significantly stretch or tear as the inner portion of the blank is forced into the female die 14. The clamping mechanism 24 only slightly compresses the blank of material so that it does not stretch or tear the blank during stamping.

The clamping mechanism 24 is preferably spring-loaded by springs 36 so that the clamping mechanism 24 exerts a clamping force at a plurality of spaced outer portions of the blank. The clamping force increases as the inner portion of the blank is forced into the female die 14 by the male die 20.

The clamping mechanism 24 includes a clamping assembly, generally indicated at 34, mounted on the member 30 to move with the male die 20. The clamping assembly 34 includes a clamp, generally indicated at 35 in FIG. 2, supported by rods 38 which are slidably secured within the member 30. The clamping assembly 34 also includes the springs 36 positioned about their respective rods 38. The springs 36 compresses as the inner portion of the blank is forced into the female die 14 by movement of the male die 20 into the article-defining cavity 18 of the female die 14. At the same time, the rods 38 slide into the upper movable member 30.

As shown in FIGS. 1 and 2, the clamp 35 includes a plurality of spaced, wedge-shaped, elongated blocks 40 mounted on a frame member 41 of the clamp 35. Each of blocks 40 includes an inclined clamping surface 42 which engages an upper surface of the blank of material during the deep-drawing process. A stop mechanism 48 (shown in FIG. 2) is mounted on the frame member 41 to control the thickness of the resulting article.

The clamping mechanism 24 also includes a counter clamping assembly, generally indicated at 50, which together with the clamping assembly 34 clamps the blank at a plurality of spaced outer portions immediately adjacent the female die 14. A substantially constant distance, as indicated in FIG. 2, is maintained between the clamping assembly 34 and the counter clamping assembly 50 as the inner portion of the blank is forced into the female die 14.

The counter clamping assembly 50 also includes a plurality of spaced wedge-shaped blocks 52 mounted on an upper surface 54 of the female die 14. Each of the blocks 52 includes an elongated clamping surface 56 for clamping the plurality of spaced outer portions of the blank against the surfaces 42 of the blocks 40. All of the elongated clamping surfaces 42 and 56 are inclined at the same acute angle with respect to the vertical axis 22.

The side and bottom surfaces 18 of the female die 14 define a plurality of lower corners which correspond to or are aligned with spaces between the plurality of spaced outer portions of the blank and spaces between the blocks 40 of the clamp 35 as best shown in the above-noted U.S. patent application. The spaces also correspond to spaces between the blocks 52 of the counter clamping assembly 50 and are sized to permit thermoplastic sandwich material of the blank to move therein as the inner portion of the blank is forced into the female die 14.

The blocks 52 of the counter clamp assembly 50 also have upper support surfaces 64 for supporting a heated blank of material while it is still relatively soft prior to stamping.

The two different types of skins previously mentioned give different deformations to the deep-drawn material that are not part of the resulting article as illustrated in FIG. 7 and must be trimmed off such as by cutting.

Figure 5:
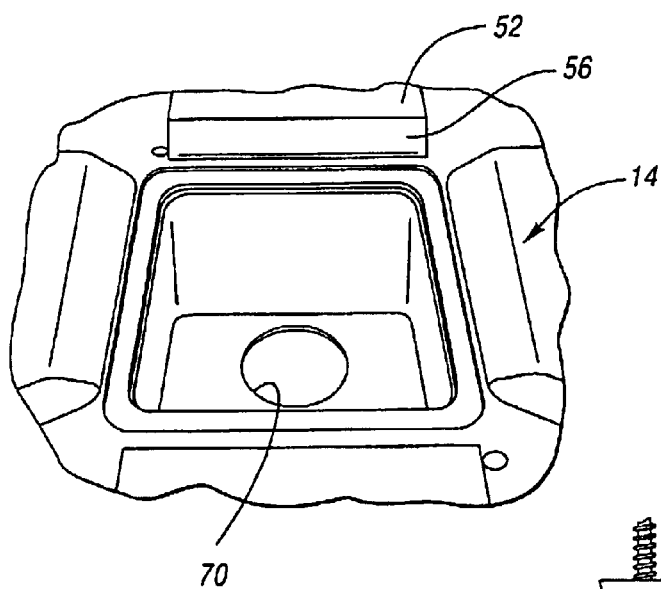
FIG. 5 is a top schematic view of a steel plate that forms the female die of the inner mold and which is centrally located within the female die of the outer mold.
Figure 6:
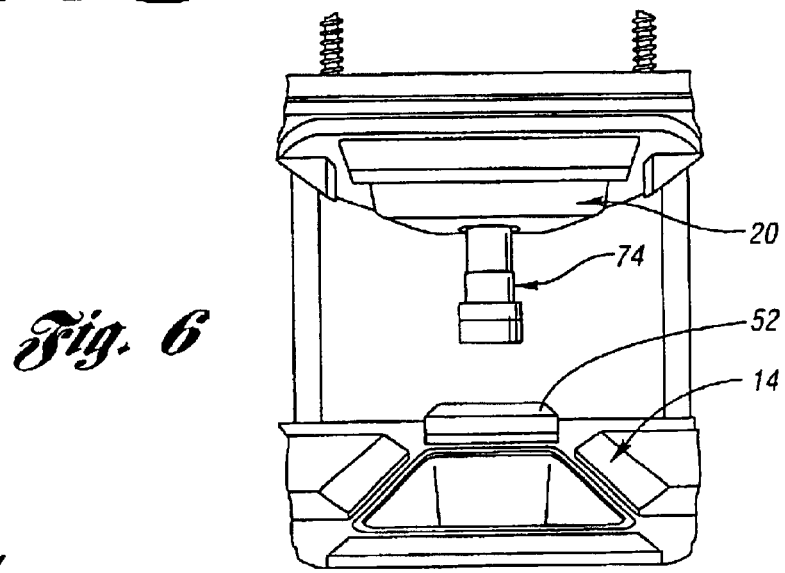
FIG. 6 is a side elevational view, partially broken away and in cross-section, of the inner and outer molds of FIG. 1 with the male die of the inner mold in an extended position.

The female die 14 may be reinforced with a steel plate 70 (i.e. FIG. 5) which then defines an inner female die and which has a thickness of approximately 30 mm. The inner male die includes a steel sleeve 72 and a hydraulic dashpot or jack 74 and a shear edge 76 which goes into the inner female die. A metal nut or other connector such as a stud (not shown) may be held by a center portion of the inner female die and is over-molded by the GMT. When the outer mold is open, the GMT (i.e. inner) female mold is in the shear edge 76.

Initially, the TSM and GMT blanks are heated in an oven up to about 200° C. After putting the heated TSM blank on the female die 14, the heated GMT blank is laid onto the TSM blank. The outer mold is closed and the TSM tub of FIG. 7 is formed. The GMT zone is tight because-of the crushing of the TSM in the area of the periphery of the GMT part. The hydraulic dashpot 74 is activated to press the GMT blank and make it flow under a pressure of 100 bars. The GMT compresses the TSM. During the compression phase the GMT and the TSM are fused together to form the thermoplastic composite inner portion 78 (FIG. 7) of the resulting article or part.

As an alternative to GMT it is possible to use an extruded thermoplastic bulk molding compound (TPBMC) made of PP and chopped glass fibers. Instead of heating a blank of GMT, the TPBMC is extruded hot into the TSM blank by an extruder and the press is closed. The rest of the process is the same. Also, it is possible to inject the TPBMC with an injector onto the sandwiform blank when the mold is closed.

A production tool or outer mold would preferably be 100% steel. The principle of a high pressure inner mold inside a low pressure outer mold would be the same as described above.

The resistance of the GMT inner portion or insert 78 as compared to vibration welding of a GMT insert as a secondary operation has been tested. For co-molded GMT-TSM the resistance of the GMT fixation or insert 78 is 4080 N and the fixation 78 breaks in the GMT part and not at the interface between the GMT and the TSM.

If the same GMT fixation or insert is molded separately and attached to the TSM part by vibration welding, the resistance of the fixation under the same conditions is 2060 N and the fixation breaks at the interface between the TSM and the GMT. The co-molded GMT fixation or insert 78 is therefore more resistant than the vibration-welded one.

The advantages of the method and system of the present invention are:

A combined TSM and GMT part can be molded in the same mold in one step; no costly secondary operation is needed and resulting part is cheaper.

Only one mold is required: less capital investment.

The interface between the GMT and the TSM is much better than the interface provided by secondary operation such as welding.

While the best mode for carrying out the invention has been described in detail, those familiar with the art to which this invention relates will recognize various alternative designs and embodiments for practicing the invention as defined by the following claims.

What is claimed is:

1. A system for co-molding a thermoplastic material with a thermoplastic sandwich material to form a thermoplastic sandwich article having a thermoplastic inner portion, the system comprising:

a female die having an article-defining cavity defined by inner surfaces of the female die;

a crushing device for crushing a peripheral edge portion of a blank of sandwich material having a cellular core and outer skins about a predetermined amount of thermoplastic material placed on the blank; and a male die for forcing the thermoplastic material and the sandwich material within the peripheral edge portion together at a temperature and pressure sufficient to fuse the materials together to form a thermoplastic inner portion of the sandwich material.

2. The system as claimed in claim 1 further comprising:

an outer male die for forcing an inner portion of the blank of thermoplastic sandwich material and the predetermined amount of thermoplastic material placed on the blank into the female die along a substantially vertical axis and against the inner surfaces of the female die to obtain deep-drawn sandwich material; and a clamping mechanism for clamping at least one outer portion of the blank immediately adjacent the female die to guide the at least one outer portion of the blank to travel into the article-defining cavity at an acute angle with respect to the vertical axis during forcing of the inner portion of the blank into the female die so that thickness of at least one side wall of the deep-drawn sandwich material is substantially the same as thickness of the blank of thermoplastic sandwich material and so that the deep-drawn sandwich material does not significantly stretch or tear as the inner portion of the blank is forced into the female die.

3. The system as claimed in claim 2 further comprising a stamping press for forcing the outer male die into the female die.

4. The system as claimed in claim 1 further comprising a hydraulic jack for forcing the male die into the female die.

5. The system as claimed in claim 1 wherein the predetermined amount of thermoplastic material is in the form of a blank of thermoplastic material.

6. The system as claimed in further comprising an extruder for extruding the predetermined amount of thermoplastic material.

7. The system as claimed in claim 1 further comprising an injector for injecting the predetermined amount of thermoplastic material.

8. The system as claimed in claim 2 wherein the clamping mechanism is spring-loaded so that the clamping mechanism exerts a clamping force at the at least one outer portion of the blank, the clamping force increasing as the inner portion of the blank is forced into the female die.

9. The system as claimed in claim 8 wherein the clamping mechanism includes a clamping assembly mounted to move with the male die and having at least one spring which compresses as the inner portion of the blank is forced into the female die.

10. The system as claimed in claim 2 wherein the clamping mechanism includes a clamping assembly and a counter clamping assembly for clamping a plurality of spaced outer portions of the blank immediately adjacent the female die and wherein a substantially constant distance is maintained between the clamping assembly and the counter clamping assembly as the inner portion of the blank is forced into the female die.

11. The system as claimed in claim 10 wherein each of the assemblies includes a plurality of elongated clamping surfaces for clamping the plurality of spaced outer portions of the blank and wherein each elongated clamping surface is inclined at the acute angle with respect to the vertical axis.

12. The system as claimed in claim 10 wherein the inner surfaces of the female die define a plurality of corners which correspond to spaces between the plurality of spaced outer portions and wherein the spaces are sized to permit thermoplastic sandwich material of the blank to move therein as the inner portion of the blank is forced into the female die.

13. The system as claimed in claim 1 wherein the peripheral edge portion completely encloses the thermoplastic material.

14. A system for co-molding a thermoplastic material with a thermoplastic sandwich material to form a thermoplastic sandwich article having a thermoplastic inner portion, the system comprising:

a female die having an article-defining cavity defined by inner surfaces of the female die;

a crushing device for crushing a peripheral edge portion of a blank of sandwich material having a cellular core and outer skins about a predetermined amount of thermoplastic material placed on the blank;

a male die for forcing the thermoplastic material and the sandwich material within the peripheral edge portion together at a temperature and pressure sufficient to fuse the materials together to form a thermoplastic inner portion of the sandwich material; and a hydraulic jack for forcing the male die into the female die.

15. A system for co-molding a thermoplastic material with a thermoplastic sandwich material to form a thermoplastic sandwich article having a thermoplastic inner portion, the system comprising:

a female die having an article-defining cavity defined by inner surfaces of the female die;

a crushing device for crushing a peripheral edge portion of a blank of sandwich material having a cellular core and outer skins about a predetermined amount of thermoplastic material placed on the blank;

a male die for forcing the thermoplastic material and the sandwich material within the peripheral edge portion together at a temperature and pressure sufficient to fuse the materials together to form a thermoplastic inner portion of the sandwich material; and an injector for injecting the predetermined amount of thermoplastic material.

* * * * *